(12) United States Patent
Aizono et al.

(10) Patent No.: US 10,909,558 B2
(45) Date of Patent: Feb. 2, 2021

(54) MARKETING SUPPORT SYSTEM

(71) Applicant: Hitachi, Ltd., Tokyo (JP)

(72) Inventors: Toshiko Aizono, Tokyo (JP); Wenpeng Wei, Tokyo (JP); Takuya Mogawa, Tokyo (JP); Kazuaki Tokunaga, Tokyo (JP); Yasuharu Namba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 197 days.

(21) Appl. No.: 16/081,155

(22) PCT Filed: Mar. 15, 2017

(86) PCT No.: PCT/JP2017/010294
§ 371 (c)(1),
(2) Date: Aug. 30, 2018

(87) PCT Pub. No.: WO2018/061249
PCT Pub. Date: Apr. 5, 2018

(65) Prior Publication Data
US 2019/0066131 A1 Feb. 28, 2019

(30) Foreign Application Priority Data
Sep. 30, 2016 (JP) .................. 2016-192550

(51) Int. Cl.
G06Q 30/02 (2012.01)
G06N 5/00 (2006.01)
G06N 5/04 (2006.01)

(52) U.S. Cl.
CPC .......... *G06Q 30/0202* (2013.01); *G06N 5/00* (2013.01); *G06N 5/045* (2013.01); *G06Q 30/02* (2013.01); *G06Q 30/0201* (2013.01)

(58) Field of Classification Search
CPC ......... G06Q 10/00; G06Q 40/00; G06Q 40/06
(Continued)

(56) References Cited

U.S. PATENT DOCUMENTS 5,930,764 A * 7/1999 Melchione ............. G06Q 30/02
705/7.29
6,578,009 B1 * 6/2003 Shinozaki ............. G06Q 10/06
705/36 R (Continued)

FOREIGN PATENT DOCUMENTS

JP 2014-081750 A 5/2014

OTHER PUBLICATIONS

Gerrit et al "mproving decision making by means of a marketing decision support system", May 1998, Management Science/vol. 44 No. 5, pp. 645-658 (Year: 1998).*

(Continued)

*Primary Examiner* — Romain Jeanty
(74) *Attorney, Agent, or Firm* — Mattingly & Malur, PC

(57) ABSTRACT

When multiple explanatory variables are automatically created, a huge amount of output suggestions causes a heavy burden on selecting the suggestion. A marketing support system is configured to include a suggestion extraction unit that accepts purchase data and analyzes a correlation between the purchase data to output a composite variable, a restriction filtering unit that accepts the composite variable and a restriction table to exclude the composite variable based on a restriction condition defined in the restriction table, and a result filtering unit that uses a measure result defined in the past to estimate an anticipated effect when a measure based on the composite variable is performed, and selects a plurality of explanatory variables.

2 Claims, 9 Drawing Sheets

(58) Field of Classification Search
USPC .............................................. 705/7.31–7.39
See application file for complete search history.

(56) References Cited

U.S. PATENT DOCUMENTS

| | | | | |
|---|---|---|---|---|
| 6,868,390 | B1* | 3/2005 | Shimada | G06Q 30/02 |
| | | | | 705/14.41 |
| 8,423,449 | B2* | 4/2013 | Sherman | G06Q 40/04 |
| | | | | 705/37 |
| 2002/0032617 | A1* | 3/2002 | Takahashi | G06Q 40/04 |
| | | | | 705/26.1 |
| 2004/0078796 | A1* | 4/2004 | Utsumi | G06Q 10/06 |
| | | | | 718/105 |
| 2008/0294450 | A1* | 11/2008 | Kasahara | G06Q 30/02 |
| | | | | 705/1.1 |
| 2010/0262464 | A1* | 10/2010 | Monteforte | G06Q 10/00 |
| | | | | 705/7.29 |
| 2013/0238435 | A1* | 9/2013 | Barak | G06O 30/02 |
| | | | | 705/14.53 |
| 2014/0108100 | A1 | 4/2014 | Moriwaki et al. | |

OTHER PUBLICATIONS

International Search Report of PCT/JP2017/010294 dated Jun. 6, 2017.

\* cited by examiner

FIG. 2

PURCHASE DATA 101

| CUSTOMER ID | PRODUCT ID | DATE AND TIME | QUANTITY | AMOUNT OF MONEY | RECEIPT ID | ... |
|---|---|---|---|---|---|---|
| 1001 | 5000 | 2016-01-01 | 1 | 500 | 1 | ... |
| 1002 | 5001 | 2016-01-01 | 2 | 300 | 1 | ... |

FIG. 3

COMPOSITE VARIABLE ITEM TABLE 201

| COLUMN NAME | TYPE | DESCRIPTION |
|---|---|---|
| ID | INT | ITEM ID |
| NAME | CHAR() | ITEM NAME |
| TURNING | BOOL | CONTROLLABLE? |

RESTRICTION TABLE 202

| COLUMN NAME | TYPE | DESCRIPTION |
|---|---|---|
| ID | INT | RESTRICTION ID |
| ITEM ID | INT | COMPOSITE ITEM ID |
| VALUE | CHAR() | VALUE |
| VALUE_TYPE_ID | INT | VALUE TYPE ID |

RESULT TABLE 203

| COLUMN NAME | TYPE | DESCRIPTION |
|---|---|---|
| ID | INT | RESULT ID |
| DATETIME | DATETIME | MEASURE DATE AND TIME |
| DOMAIN | CHAR() | ('KPI', 'ACT', 'COMB', 'ACT_EVL') |
| DOMAIN_ID | INT | KPI ID/MEASURE VARIABLE ID/ COMPOSITE VARIABLE ID |
| VALUE | CHAR() | VALUE |
| PCTG_VALUE | CHAR() | PERCENTAGE OF VALUE |
| VALUE_TYPE_ID | INT | VALUE TYPE ID |

KPI ITEM TABLE 204

| COLUMN NAME | TYPE | DESCRIPTION |
|---|---|---|
| ID | INT | KPI ID |
| NAME | CHAR() | KPI NAME |

MEASURE VARIABLE TABLE 205

| COLUMN NAME | TYPE | DESCRIPTION |
|---|---|---|
| ID | INT | MEASURE VARIABLE ID |
| NAME | CHAR() | MEASURE VARIABLE NAME |

VALUE TYPE TABLE 206

| COLUMN NAME | TYPE | DESCRIPTION |
|---|---|---|
| ID | INT | VALUE TYPE ID |
| TYPE | CHAR() | VALUE TYPE NAME |

TARGET PERSON TABLE 207

| COLUMN NAME | TYPE | DESCRIPTION |
|---|---|---|
| OP_ID | INT | MEASURE RESULT ID |
| CTM_ID | CHAR() | CUSTOMER ID |
| TYPE | CHAR() | TARGET PERSON TYPE |

FIG. 5

COMPOSITE VARIABLE 102

| ID | VARIABLE NAME 1 | VARIABLE CONDITION 1 | VARIABLE NAME 2 | VARIABLE CONDITION 2 | VARIABLE NAME 3 | VARIABLE CONDITION 3 | ... |
|---|---|---|---|---|---|---|---|
| l1 | NUMBER OF VISITED STORES | [0.0]–[2.0] | NUMBER OF PURCHASED ITEMS OF MEAT | [7.0]–[34.0] | NUMBER OF PURCHASED ITEMS OF SOFT DRINK | [13.0]–[28.0] | ... |
| l2 | MOST VISITED TIME ZONE | [1.0]–[13] | NUMBER OF PURCHASED ITEMS OF BEER | [7.0]–[34.0] | AGE | [17]–[24] | ... |
| l3 | NUMBER OF PURCHASED ITEMS OF DESSERT | [7.0]–[13.0] | SEX | [FEMALE] | AGE | [25]–[41] | ... |

MICRO TABLE 103

| CUSTOMER ID | NUMBER OF PURCHASED ITEMS OF DESSERT | NUMBER OF VISITED STORES | SEX | NUMBER OF PURCHASED ITEMS OF MEAT | AGE | NUMBER OF PURCHASED ITEMS OF SOFT DRINK | ... |
|---|---|---|---|---|---|---|---|
| 1001 | [5.5] | [1.1] | [FEMALE] | [8.2] | [22] | [15.2] | ... |
| 1002 | [0.2] | [2.1] | [MALE] | [1.3] | [15] | [6.7] | ... |

FIG. 6

COMPOSITE VARIABLE ITEM TABLE 201

| ID | NAME | TURNING |
|---|---|---|
| 1 | NUMBER OF PURCHASED ITEMS OF BEER | T |
| 2 | SEX | F |
| 3 | AGE | F |
| ... | | |

RESTRICTION TABLE 202

| ID | ITEM_ID | VALUE | V_T_ID |
|---|---|---|---|
| 7 | 1 | [0]–[INF] | 1 |
| 7 | 3 | [-INF]–[20] | 1 |
| 8 | 2 | [MALE] | 2 |

COMPOSITE VARIABLE 102

| ID | VARIABLE NAME 1 | VARIABLE CONDITION 1 | VARIABLE NAME 2 | VARIABLE CONDITION 2 | VARIABLE NAME 3 | VARIABLE CONDITION 3 | ... |
|---|---|---|---|---|---|---|---|
| 11 | NUMBER OF VISITED STORES | [0.0]–[2.0] | NUMBER OF PURCHASED ITEMS OF MEAT | [7.0]–[34.0] | NUMBER OF PURCHASED ITEMS OF SOFT DRINK | [13.0]–[28.0] | ... |
| 12 | MOST VISITED TIME ZONE | [10]–[13] | NUMBER OF PURCHASED ITEMS OF BEER | [7.0]–[34.0] | AGE | [17]–[24] | ... |
| 13 | NUMBER OF PURCHASED ITEMS OF DESSERT | [7.0]–[13.0] | SEX | [FEMALE] | AGE | [25]–[41] | ... |

FIG. 7

RESULT TABLE 203

| ID | DOMAIN | DOMAIN_ID | VALUE | PCTG_VALUE | VALUE_TYPE_ID |
|---|---|---|---|---|---|
| 1 | KPI | 1(NUMBER OF ORDERS) | [5.0] | [50%] | 2(FIGURE) |
| 1 | KPI | 1(CHANGE RATE OF NUMBER OF ORDERS) | [30%] | [90%] | 3(PERCENTAGE) |
| 1 | COMB | 3(NUMBER OF VISITED STORES) | [0.0]-[2.0] | [10%]-[40%] | 2(FIGURE) |
| 1 | COMB | 4(NUMBER OF PURCHASED ITEMS OF MEAT) | [7.0]-[34.0] | [10%]-[60%] | 2(FIGURE) |
| 1 | COMB | 1(NUMBER OF PURCHASED ITEMS OF SOFT DRINK) | [13.0]-[28.0] | [40%]-[50%] | 2(FIGURE) |
| 1 | ACT | 2(DISCOUNT BY COUPON) | [10%] | [40%] | 3(PERCENTAGE) |
| 2 | ... | | | | |

RESTRICTION-FILTERED COMPOSITE VARIABLE 301

| ID | VARIABLE NAME 1 | VARIABLE CONDITION 1 | VARIABLE NAME 2 | VARIABLE CONDITION 2 | VARIABLE NAME 3 | VARIABLE CONDITION 3 | ANTICIPATED KPI |
|---|---|---|---|---|---|---|---|
| 8 | NUMBER OF VISITED STORES | [0.0]-[2.0] | NUMBER OF PURCHASED ITEMS OF MEAT | [7.0]-[34.0] | NUMBER OF PURCHASED ITEMS OF SOFT DRINK | [13.0]-[28.0] | |
| 9 | NUMBER OF PURCHASED ITEMS OF DESSERT | [7.0]-[13.0] | SEX | [FEMALE] | AGE | [25]-[41] | 5.0 |

COMPOSITE VARIABLE WITH RESULT 401

| ID | VARIABLE NAME 1 | VARIABLE CONDITION 1 | VARIABLE NAME 2 | VARIABLE CONDITION 2 | VARIABLE NAME 3 | VARIABLE CONDITION 3 | ANTICIPATED KPI |
|---|---|---|---|---|---|---|---|
| 8 | NUMBER OF VISITED STORES | [0.0]-[2.0] | NUMBER OF PURCHASED ITEMS OF MEAT | [7.0]-[34.0] | NUMBER OF PURCHASED ITEMS OF SOFT DRINK | [13.0]-[28.0] | |

RESTRICTION-FILTERED COMPOSITE VARIABLE 301

| ID | VARIABLE NAME 1 | VARIABLE CONDITION 1 | VARIABLE NAME 2 | VARIABLE CONDITION 2 | VARIABLE NAME 3 | VARIABLE CONDITION 3 | GRADE |
|---|---|---|---|---|---|---|---|
| 9 | NUMBER OF PURCHASED ITEMS OF DESSERT | [7.0]-[13.0] | SEX | [FEMALE] | AGE | [25]-[41] | 3 |

FIG. 9

PURCHASE DATA 101

| CUSTOMER ID | PRODUCT ID | DATE AND TIME | QUANTITY | AMOUNT OF MONEY | RECEIPT ID | ... |
|---|---|---|---|---|---|---|
| 1001 | 5000 | 2016-01-01 | 1 | 500 | 1 | ... |
| 1002 | 5001 | 2016-01-01 | 2 | 300 | 1 | ... |

RESULT TABLE 203

| ID | DOMAIN | DOMAIN_ID | VALUE | PCTG_VALUE | VALUE_TYPE_ID | ... |
|---|---|---|---|---|---|---|
| 1 | COMB | 3(NUMBER OF VISITED STORES) | [0.0]-[2.0] | [10%]-[40%] | 2(FIGURE) | |
| 1 | COMB | 4(NUMBER OF PURCHASED ITEMS OF MEAT) | [7.0]-[34.0] | [10%]-[60%] | 2(FIGURE) | |
| 1 | COMB | 1(NUMBER OF PURCHASED ITEMS OF SOFT DRINK) | [13.0]-[28.0] | [40%]-[50%] | 2(FIGURE) | |
| 1 | ACT | 2(DISCOUNT BY COUPON) | 100 | [40%] | 2(FIGURE) | |
| 1 | ACT_EVL | 1(KEEP RATE) | | | 3(PERCENTAGE) | |
| 1 | ACT_EVL | 2(TRANSITION RATE) | | | 3(PERCENTAGE) | |

TARGET PERSON TABLE 207

| OP_ID | CTM_ID | TYPE |
|---|---|---|
| 1 | 1001 | K_A |
| 1 | 2104 | K_B |
| 1 | 1002 | S_A |
| 1 | 6617 | S_B |

RESULT TABLE 203

| ID | DOMAIN | DOMAIN_ID | VALUE | PCTG_VALUE | VALUE_TYPE_ID | ... |
|---|---|---|---|---|---|---|
| 1 | COMB | 3(NUMBER OF VISITED STORES) | [0.0]-[2.0] | [10%]-[40%] | 2(FIGURE) | |
| 1 | COMB | 4(NUMBER OF PURCHASED ITEMS OF MEAT) | [7.0]-[34.0] | [10%]-[60%] | 2(FIGURE) | |
| 1 | COMB | 1(NUMBER OF PURCHASED ITEMS OF SOFT DRINK) | [13.0]-[28.0] | [40%]-[50%] | 2(FIGURE) | |
| 1 | ACT | 2(DISCOUNT BY COUPON) | 100 | [40%] | 2(FIGURE) | |
| 1 | ACT_EVL | 1(KEEP RATE) | | | 3(PERCENTAGE) | |
| 1 | ACT_EVL | 2(TRANSITION RATE) | | | 3(PERCENTAGE) | |
| 1 | KPI | 1(NUMBER OF ORDERS) | 20 | [10%] | 2 | |

MARKETING SUPPORT SYSTEM

TECHNICAL FIELD

The present invention relates to a marketing support system.

BACKGROUND ART

In distribution and retail trade industries, a POS system has become popular, and recently, use of reward cards and electronic moneys has explosively increased. Thus, a huge amount of attribute information and purchase histories of customers have been accumulated in a business system. The distribution and the retail trade industries have needs for utilizing such data to improve a KPI of sales and the like, and for this, there is a technique to extract a suggestion for a measure to improve the KPI from the data (Patent Literature 1).

CITATION LIST

Patent Literature

Patent Literature 1: Japanese Unexamined Patent Application Publication No. 2014-81750

SUMMARY OF INVENTION

Technical Problem

The technique disclosed in Patent Literature 1 can automatically create multiple explanatory variables contributing to the improvement of the KPI as the suggestions, and can support effective measure introducing actions. However, since the amount of the output suggestions is huge, a problem arises in that it is a heavy burden and a difficult work for an analyst to exclude a suggestion with a low possibility and select a suggestion with a high effect.

Solution to Problem

As an example of representative means to solve the problem according to the present invention, a marketing support system is configured to include a suggestion extraction unit that accepts purchase data and analyzes a correlation between the purchase data to output a composite variable, a restriction filtering unit that accepts the composite variable and a restriction table to exclude the composite variable based on a restriction condition defined in the restriction table, and a result filtering unit that uses a measure result defined in the past to estimate an anticipated effect when a measure based on the composite variable is performed, and selects a plurality of explanatory variables.

Advantageous Effects of Invention

The present invention can reduce a burden on an analyst.

BRIEF DESCRIPTION OF DRAWINGS

FIG. 2 is a drawing illustrating exemplary purchase data 6 in the first embodiment of the present invention.

FIG. 3 is a drawing illustrating an exemplary knowledge base 7 in the first embodiment of the present invention.

FIG. 5 is a drawing illustrating an exemplary suggestion output by a suggestion extraction unit 1 in the first embodiment of the present invention.

FIG. 6 is a drawing illustrating exemplary processing by a restriction filtering unit 2 in the first embodiment of the present invention.

FIG. 7 is a drawing illustrating exemplary processing by a result filtering unit 3 in the first embodiment of the present invention.

FIG. 9 is a drawing illustrating exemplary processing by a measure effect calculation unit 5 in the first embodiment of the present invention.

DESCRIPTION OF EMBODIMENTS

First Embodiment

Figure 1:
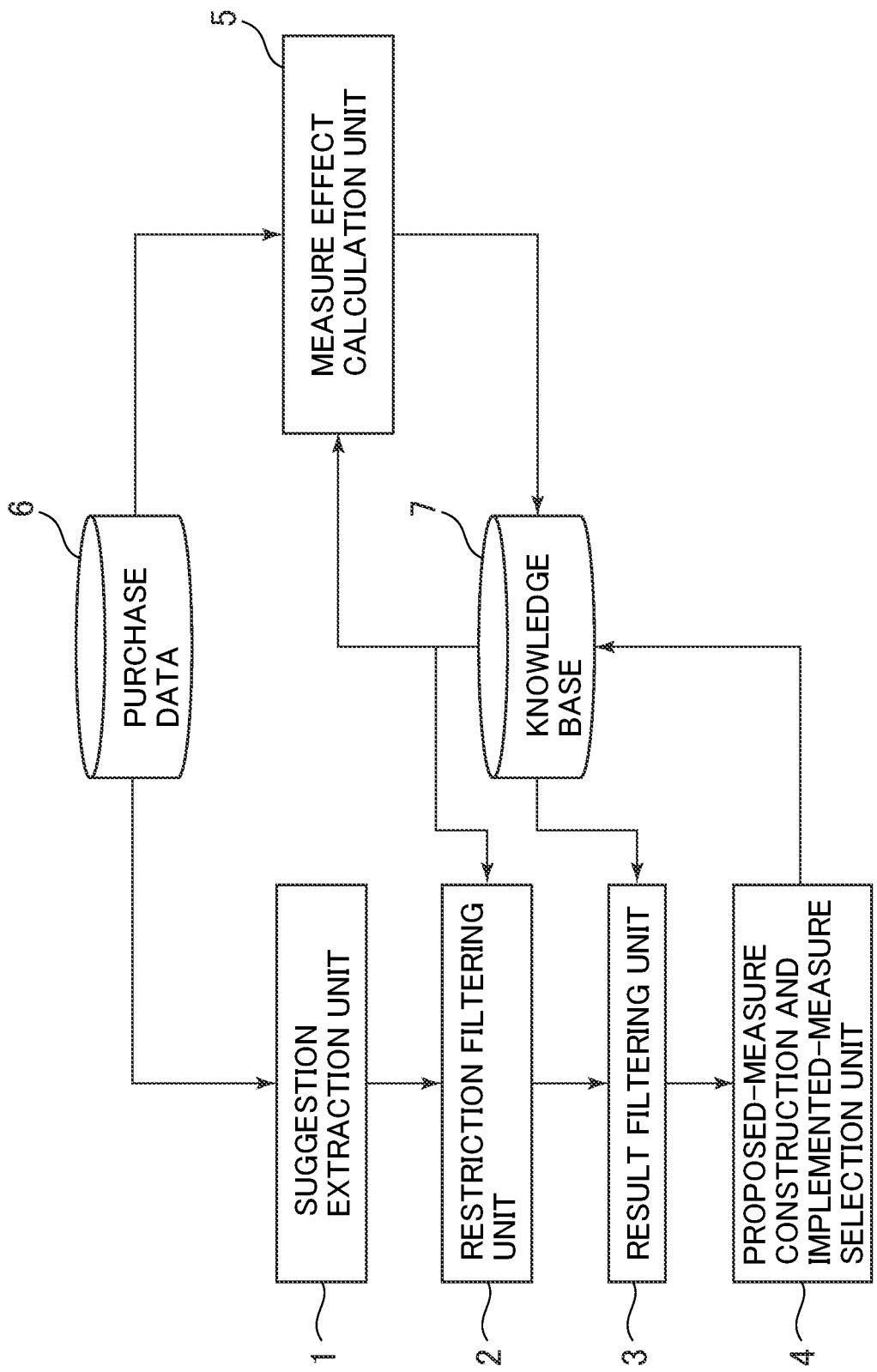
FIG. 1 is a drawing illustrating an overall configuration of a first embodiment of the present invention.

FIG. 1 illustrates an overall configuration of a first embodiment of the present invention. As illustrated in FIG. 1, the first embodiment of the present invention includes a suggestion extraction unit 1, a restriction filtering unit 2, a result filtering unit 3, a proposed-measure construction and implemented-measure selection unit 4, a measure effect calculation unit 5, which are processing units, and purchase data 6 and a knowledge base 7 as data.

<Description of Purchase Data 6>

FIG. 2 illustrates exemplary purchase data 6. As illustrated in FIG. 2, the purchase data 6 includes records having a customer ID, a product ID, a date and time, a quantity, an amount of money, and a receipt ID.

<Description of Knowledge Base 7>

Figure 4:
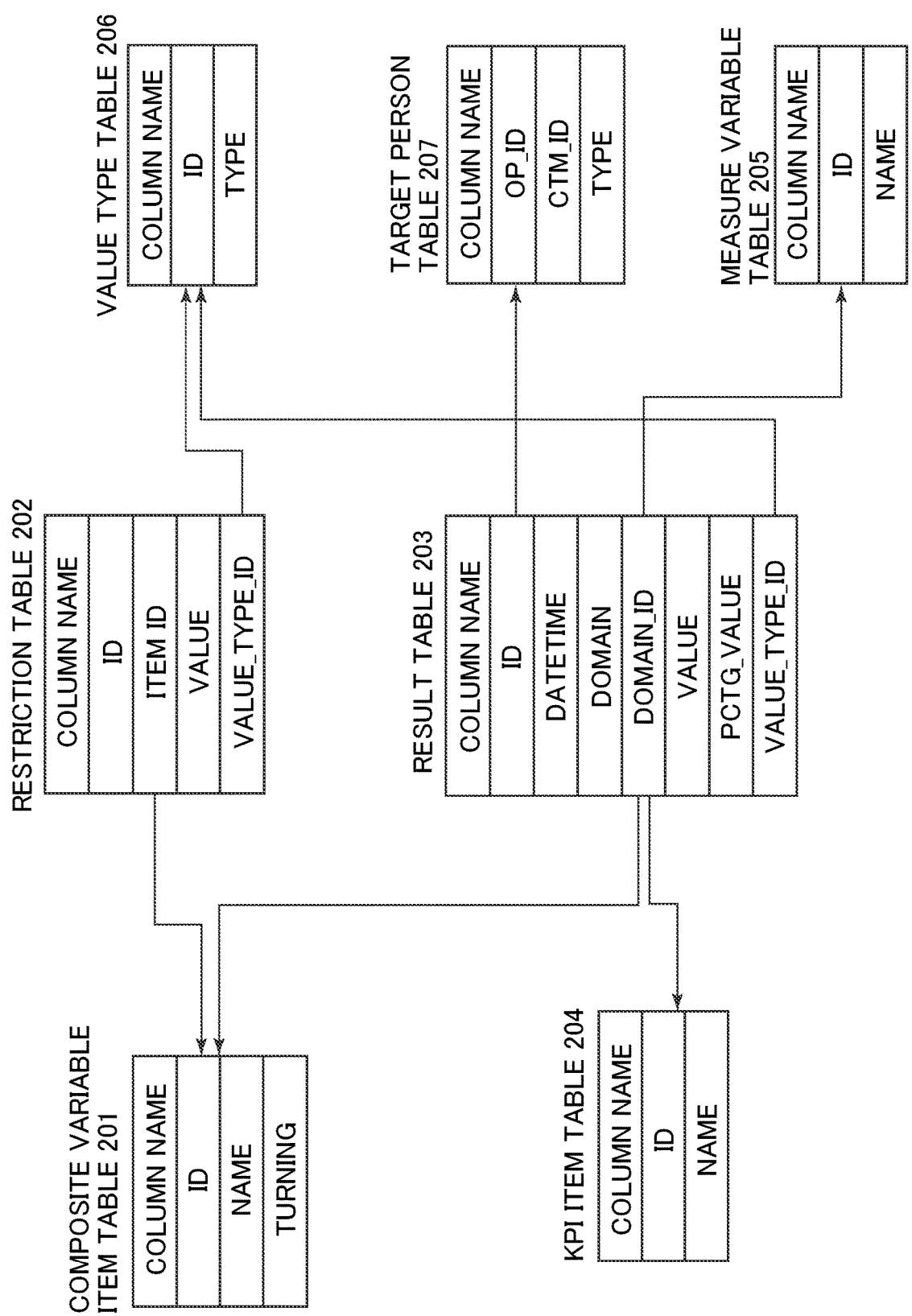
FIG. 4 is a drawing illustrating an exemplary knowledge base 7 in the first embodiment of the present invention, and an ER diagram illustrating relations between tables.

FIG. 3 and FIG. 4 illustrate examples of the knowledge base 7. As illustrated in FIG. 4, the knowledge base 7 includes a composite variable item table 201, a restriction table 202, a result table 203, a composite variable item table 201, a KPI item table 204, a measure variable table 205, a value type table 206, and a target person table 207.

<Description of Processing by Suggestion Extraction Unit 1>

The suggestion extraction unit 1 accepts purchase data 101, analyzes a correlation between the data, and outputs a composite variable 102 describing a target state.

FIG. 5 illustrates exemplary processing by the suggestion extraction unit 1. As illustrated in FIG. 5, the suggestion extraction unit 1 extracts the composite variable 102 that holds features of good customers in a form of a variable name and a variable condition, and a micro table 103 that holds features of respective customers in a form of values of respective variables from the purchase data 101.

<Description of Processing by Restriction Filtering Unit 2>

The restriction filtering unit 2 accepts the composite variable 102, the composite variable item table 201, and the restriction table 202, deletes a record that satisfies every restriction condition of an identical restriction ID defined in the restriction table 202 and the composite variable item table 201 from the composite variable item table 201, and outputs a restriction-filtered composite variable 301.

FIG. 6 illustrates exemplary processing by the restriction filtering unit 2. As illustrated in FIG. 6, the restriction filtering unit 2 reads a restriction having an ID of 7 defined in the restriction table 202 and the composite variable item table 201, and deletes a record having the ID of 12 that satisfies the restriction condition where "the number of purchased items of beer" is "0" or more and "age" is "20" or less from the composite variable 102.

<Description of Processing by Result Filtering Unit 3>

The result filtering unit 3 accepts the restriction-filtered composite variable 301, the result table 203, the composite variable item table 201, the KPI item table 204, the measure variable table 205, and the value type table 206. Every measure result defined in the result table 203 in the past is referred for each record of the restriction-filtered composite variable 301, and a measure result in a state identical to a state defined with the composite variable is estimated as an anticipated effect. When there is the result, an average value of measured KPIs of the result is defined as an anticipated KPI of the corresponding composite variable. When there is no result, a normalized average value of a gradient of the composite variable, a coefficient of correlation, and a corresponding number is defined as a score. The composite variables with result are sorted in a descending order of the anticipated KPI, and are output as composite variables 401 with result. The composite variables without result are sorted in a descending order of the score, and are output as composite variables 402 without result.

FIG. 7 illustrates exemplary processing by the result filtering unit 3. As illustrated in FIG. 7, the result filtering unit 3 reads results having the IDs of 1 defined in the result table 203 and extracts the record having the ID of 8 from the restriction-filtered composite variable 301, the record having the ID of 8 satisfying the state where "the number of visited stores" is "0" to "2," and "the number of meat purchasing" is "7" to "34," and the number of purchased items of soft drink" is "13" to "28." The result filtering unit 3 stores the record having the ID of 8 in the composite variable with result 401 while defining the anticipated KPI as "5," which is the KPI value of the result having the ID of 1, and sorts in the descending order of the anticipated KPI. The scores of records having the IDs of 9 remaining in the restriction-filtered composite variable 301 is calculated, the records having the IDs of 9 are stored in the composite variable without result 402, and the composite variable 402 without result are sorted in the descending order of the score.

<Description of Processing by Proposed-Measure Construction and Implemented-Measure Selection Unit 4>

The proposed-measure construction and implemented-measure selection unit 4 accepts the composite variable with result 401, the composite variable without result 402, the result table 203, the composite variable item table 201, the KPI item table 204, the measure variable table 205, the value type table 206, the target person table 207, and the micro table 103. The proposed-measure construction and implemented-measure selection unit 4 indicates the records of the composite variable with result 401 and the composite variable without result 402 from the top, and accepts the ID of the composite variable desired to be employed as a measure from a user.

A state desired to be employed as the measure is searched with the ID of the composite variable desired to be employed as the measure in the composite variable with result 401 and the composite variable without result 402, and a consumer in a state close to this state is selected from the micro table 103 to be defined as an target person of the measure. The target person of the measure and measure contents recorded in the result table 203 are output together as a measure proposal 501. The contents of the measure proposal 501 are recorded on the result table 203 and the target person table 207.

Figure 8:
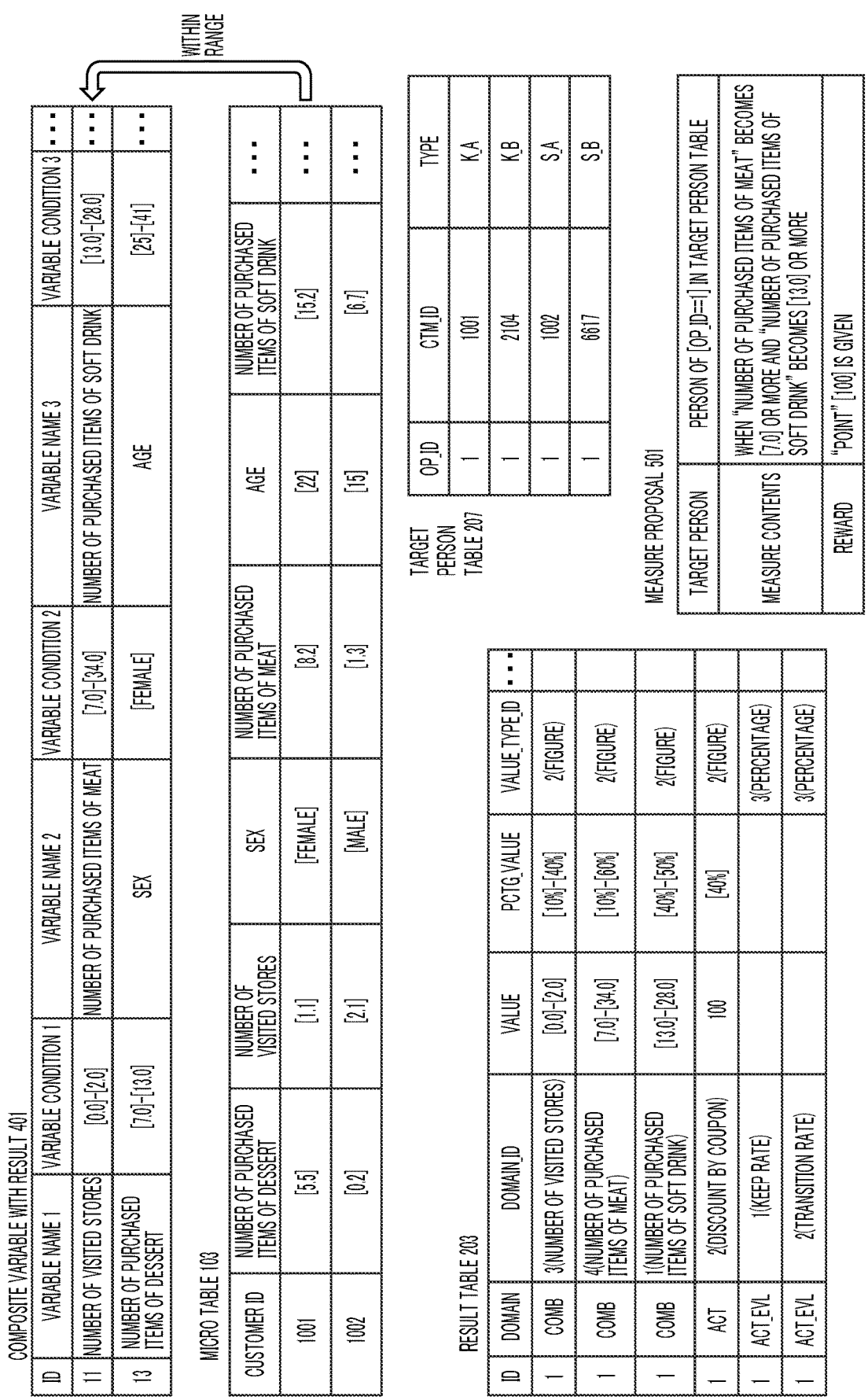
FIG. 8 is a drawing illustrating exemplary processing by a proposed-measure construction and implemented-measure selection unit 4 in the first embodiment of the present invention.

FIG. 8 illustrates exemplary processing by the proposed-measure construction and implemented-measure selection unit 4. As illustrated in FIG. 8, the proposed-measure construction and implemented-measure selection unit 4 reads the record having the ID of 11 from the composite variable with result 401, extracts the record having "the customer ID" of "1001" from the micro table 103, and saves it in the target person table 207, the record having "the customer ID" of "1001" satisfying the state where "the number of visited stores" is "0" to "2," and "the number of purchased items of meat" is "7" to "34," and "the number of purchased items of soft drink" is "13" to "28." The above-described state is saved as a state of the measure result in the result table 203. The above-described state is defined as the measure contents, and is output as the measure proposal 501 together with the above-described target person.

<Description of Processing by Measure Effect Calculation Unit 5>

The measure effect calculation unit 5 accepts the purchase data 101, the result table 203, the composite variable item table 201, the KPI item table 204, the measure variable table 205, the value type table 206, and the target person table 207. On unevaluated records of the respective measure results recorded in the result table 203 and the target person table 207, data on the measure target person during a measure period is extracted from the purchase data 101, the KPI is calculated, and the result table 203 is updated.

FIG. 9 illustrates exemplary processing by the measure effect calculation unit 5. As illustrated in FIG. 9, the measure effect calculation unit 5 extracts the record having the customer ID recorded in the target person table 207 from the purchase data 101, counts the number of orders as the KPI, and adds its average value in the result table 203.

LIST OF REFERENCE SIGNS 1 suggestion extraction unit
2 restriction filtering unit
3 result filtering unit
4 selection unit
5 calculation unit
6 purchase data
7 knowledge base

The invention claimed is:

1. A marketing support system comprising:
a suggestion extraction unit that analyzes a correlation between purchase data and generates a plurality of composite variables, each having an identifier corresponding to a name of a variable and a condition of the variable;
a restriction filtering unit that removes, from the plurality of composite variables, each composite variable that satisfies a restriction condition, among a plurality of predefined restriction conditions, of a restriction identifier and that satisfies a name of a variable having the same restriction identifier; and
a result filtering unit that uses a measure result defined in the past to estimate an anticipated effect when a measure based on the composite variable is performed, and selects a plurality of explanatory variables.

2. The marketing support system of claim 1,
wherein the variable name is one of a number of visited stores of a customer, a number of purchased items of meat, a number of purchased items of drinks, an age, and a gender, and
wherein the condition of the variables indicates a range for the variable names of the number of visited stores of the customer, the number of purchased items of meat, the number of purchased items of drinks, and the age.

* * * * *